(Model.)

S. D. MONTRESS.
KNOB ATTACHMENT.

No. 329,586.  Patented Nov. 3, 1885.

Witnesses
Richard O. Healy
John B. Florance

Inventor
Samuel D. Montress
John Inglis atty

UNITED STATES PATENT OFFICE.

SAMUEL D. MONTRESS, OF PATERSON, NEW JERSEY, ASSIGNOR TO JOHN B. FLORANCE, OF SAME PLACE.

KNOB ATTACHMENT.

SPECIFICATION forming part of Letters Patent No. 329,586, dated November 3, 1885.

Application filed February 19, 1885. Serial No. 156,340. (Model.)

*To all whom it may concern:*

Be it known that I, SAMUEL D. MONTRESS, a citizen of the United States, residing at Paterson, Passaic county, State of New Jersey, have invented a new and useful Improvement in Knob Attachments, of which the following is a specification, reference being had to the accompanying drawings, forming a part thereof.

Pre-existing door-knobs of the class shown are secured to the shank by means of lead that is poured through the orifice of the shank while in a melted state, the inner portion of the shank having suitable openings arranged in the same, which permit the melted lead to pass out through the opening of the inner end of the shank and distribute itself around the inner end of the shank, filling the voids, thereby securing the knob to its shank. This construction is open to serious objections for the reason that knobs thus secured are seldom held rigidly to their shank, in which case, owing to the softness of the securing material (lead,) and the continual turning of the knob in opposite directions, the same soon wears away the lead, until the knob falls off from its shank, which renders both knobs and shank unfit for further use.

The object of my invention is to provide a knob attachment of new construction wherein the knob is secured to its shank beyond the possibility of its escape therefrom by use, but which may be removed therefrom at pleasure when broken or to effect a change of the knob. I attain these objects by the construction shown, which will be fully explained in the specification and pointed out in the claim.

Figure 1:
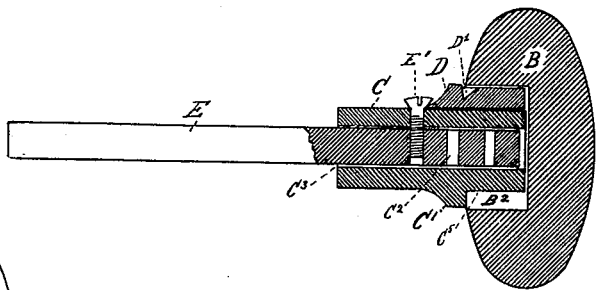
Figure 3:
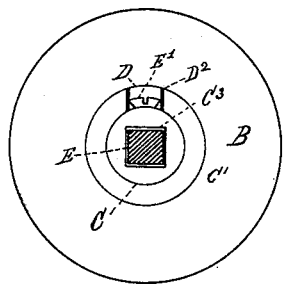
Figure 2:
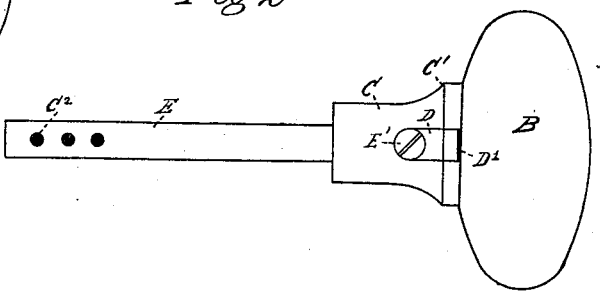
Figure 5:
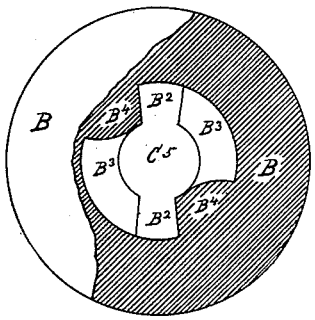
Figure 4:
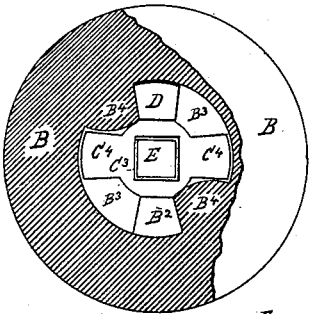
Figure 6:
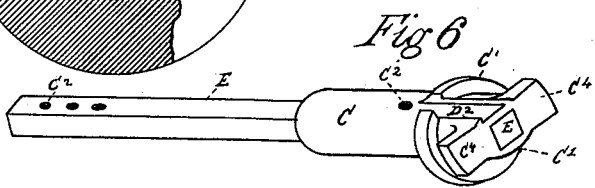

Figure 1 of the drawings shows the devices constituting my invention in section. Fig. 2 shows the same in elevation. Fig. 3 is a plan of the inner side of the knob, showing shank, key, and spindle in position, the spindle being shown in section. Fig. 4 shows the shank and key inserted in the knob, a portion of the covering being removed to show the knob's interior arrangement. Fig. 5 shows the parts of Fig. 4, with the shank and key removed from the knob; and Fig. 6 is a perspective view of the shank and spindle.

B represents a door-knob of new construction, having arranged in its interior recesses $B^3$, to accommodate lugs $C^4$, which lugs are arranged on the inner end of a shank, C, and which project sufficiently beyond the shank C to overreach the outer line of the recesses $B^3$, as shown in Fig. 4. The inner side of the knob B is provided with recesses $B^2$, which recesses are arranged one on each side of the orifice $C^5$, and project beyond said orifice $C^5$ to correspond with the lugs $C^4$ beyond the shank C, the recesses $B^2$ extending from the outer surface of the inner side of the knob B to the full depth of the recesses $B^3$. The recesses $B^2$, through which the lugs $C^4$ pass to the recesses $B^3$, correspond in size and form with the said lugs $C^4$. The key D is so formed as to occupy one of the recesses $B^2$, the shank having a flat portion to form a key-seat, as shown in Fig. 4. The key D, where the same joins the outer surface of the knob, is provided with a suitable incision, D', beyond which point outward the key conforms to the shape of the shank C until the same engages the screw E', as shown in Fig. 2.

In practice the shank C is presented to the knob B, the lugs $C^4$ passing through the recesses $B^2$ to the recesses $B^3$, and when the end of the shank C has reached the back of the recesses $B^3$ the shank C is turned in a direction to bring the lugs $C^4$ jam against the solid portions of the knob in the recesses $B^3$, after which action the recess $D^2$, formed in the shank C, is in position for the entrance of the key D, which key is then inserted into the recess $D^2$ and pushed through the recess $B^2$ of the knob B until it reaches its proper position, which firmly secures the knob B to its shank C. The screw E', which passes through the shank into the spindle E, holds the key D in position. Should the knob be broken by accident, or should a change of the knob be desired, by simply removing the screw E' and drawing out the key D by means of the incision D', the shank may be reversed, which will admit of the removal of the knob therefrom.

The knob B may be made of any suitable material or materials, substance or substances—as metal, glass, porcelain, wood, &c.

Having described my invention, what I claim as new, and desire to secure by Letters Patent in a door-knob, is—

The combination, with the knob B, having recesses $B^2$ and $B^3$, of the shank C, provided with lugs $C^4$, and recess $D^2$, said shank adapted to enter the knob and the lugs thereon to engage with the recess $B^3$, and the key D, having incision $D'$, said key being adapted, when the parts are in assembled position, to engage recesses $B^2$ and $D^2$ of the knob and shank, respectively, and held in place by the screw $E'$, which secures the shank to the spindle, substantially as described.

SAMUEL D. MONTRESS.

Witnesses:
 JOHN INGLIS,
 JOHN B. FLORANCE.